(12) United States Patent
Itagaki et al.

(10) Patent No.: US 11,067,043 B2
(45) Date of Patent: Jul. 20, 2021

(54) INTAKE MANIFOLD

(71) Applicant: Honda Motor Co., Ltd., Tokyo (JP)

(72) Inventors: Keisuke Itagaki, Wako (JP); Takeshi Honda, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/028,978

(22) Filed: Sep. 22, 2020

(65) Prior Publication Data

US 2021/0088014 A1 Mar. 25, 2021

(30) Foreign Application Priority Data

Sep. 24, 2019 (JP) .............................. JP2019-173230

(51) Int. Cl.
*F02M 35/10* (2006.01)
*F02M 35/104* (2006.01)

(52) U.S. Cl.
CPC .... *F02M 35/10236* (2013.01); *F02M 35/104* (2013.01)

(58) Field of Classification Search
CPC .................. F02M 35/10236; F02M 35/104
See application file for complete search history.

(56) References Cited

U.S. PATENT DOCUMENTS

2017/0306895 A1* 10/2017 Teramoto ............... F02M 26/19
2018/0313305 A1* 11/2018 Yamaguchi ........ F02M 35/1036

FOREIGN PATENT DOCUMENTS

JP     2008286069 A    11/2008
JP     2019105337 A     6/2019

* cited by examiner

*Primary Examiner* — Xiao En Mo
(74) *Attorney, Agent, or Firm* — Duft & Bornsen, PC

(57) ABSTRACT

An intake manifold including a surge tank having an inlet and a plurality of outlets extended along a first direction, and configured to form a space having a cross section larger than the inlet between the inlet and the plurality of outlets and a plurality of branch pipes. The space is formed by a bottom surface, an upper surface, a first surface extended from a first end of the bottom surface to a first end of the upper surface, and a second surface extended from a second end of the bottom surface to a second end of the upper surface. The inlet is provided at a substantially central portion in a first direction on the first surface, and the bottom surface includes a swelling portion swelled upwardly at a substantially central portion in the first direction.

10 Claims, 3 Drawing Sheets

INTAKE MANIFOLD

CROSS-REFERENCE TO RELATED APPLICATION

This application is based upon and claims the benefit of priority from Japanese Patent Application No. 2019-173230 filed on Sep. 24, 2019, the content of which is incorporated herein by reference.

BACKGROUND OF THE INVENTION

Field of the Invention

This invention relates to an intake manifold introducing an intake air to a plurality of cylinders of an internal combustion engine.

Description of the Related Art

Conventionally, there has been known an intake manifold having a plurality of branch pipes fastened to a side wall of a cylinder head and a surge tank connected to each of the branch pipes, and configured to distribute intake air guided into the surge tank through a throttle valve to a plurality of cylinders through the branch pipes. Such an intake manifold is described in, for example, Japanese Unexamined Patent Publication No. 2019-105337 (JP2019-105337A). In the intake manifold described in JP2019-105337A, a connection pipe is attached to a central portion in the left-right direction of the surge tank extending in the left-right direction, and intake air passing through the throttle valve flows into the surge tank through the connection pipe.

In the intake manifold, condensed water contained in the intake air may accumulate in surge tank, and there is a possibility that condensed water scatters upstream of the intake air due to the blowback of the intake air. Particularly, in the configuration in which the connection pipe is attached to the center portion in the left-right direction of the surge tank as in the intake manifold described in JP2019-105337A, there is a possibility that condensed water may adhere to the throttle valve or the like via the connection pipe, and a countermeasure for preventing the adherence of such condensed water is required.

SUMMARY OF THE INVENTION

An aspect of the present invention is an intake manifold including: a surge tank including an inlet of an air and a plurality of outlets of the air arranged in a first direction, extended along the first direction, and configured to form a space having a cross section larger than the inlet between the inlet and the plurality of outlets; and a plurality of branch pipes, each of the plurality of branch pipes having a first end connected to each of the plurality of outlets to introduce the air into a plurality of cylinders of an internal combustion engine through the each of the plurality of branch pipes. The space is formed by a bottom surface extended along the first direction and formed in a shape of a flat surface or a curved surface, an upper surface extended along the first direction to face the bottom surface, a first surface extended from a first end of the bottom surface to a first end of the upper surface, and a second surface extended from a second end of the bottom surface to a second end of the upper surface. The inlet is provided at a substantially central portion in the first direction on the first surface so that the air flows into the space along a second direction substantially perpendicular to the first direction, and the bottom surface includes a swelling portion swelled upwardly at a substantially central portion in the first direction.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
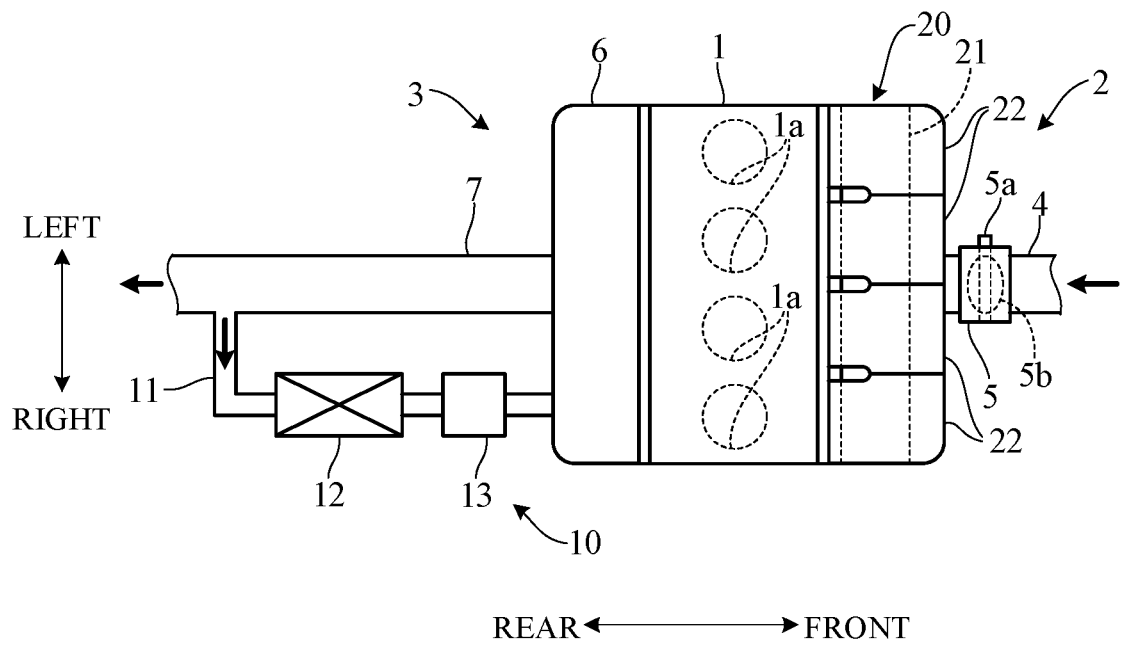
FIG. 1 is a plan view schematically showing an example of installation of an intake manifold according to an embodiment of the present invention.
Figure 2:
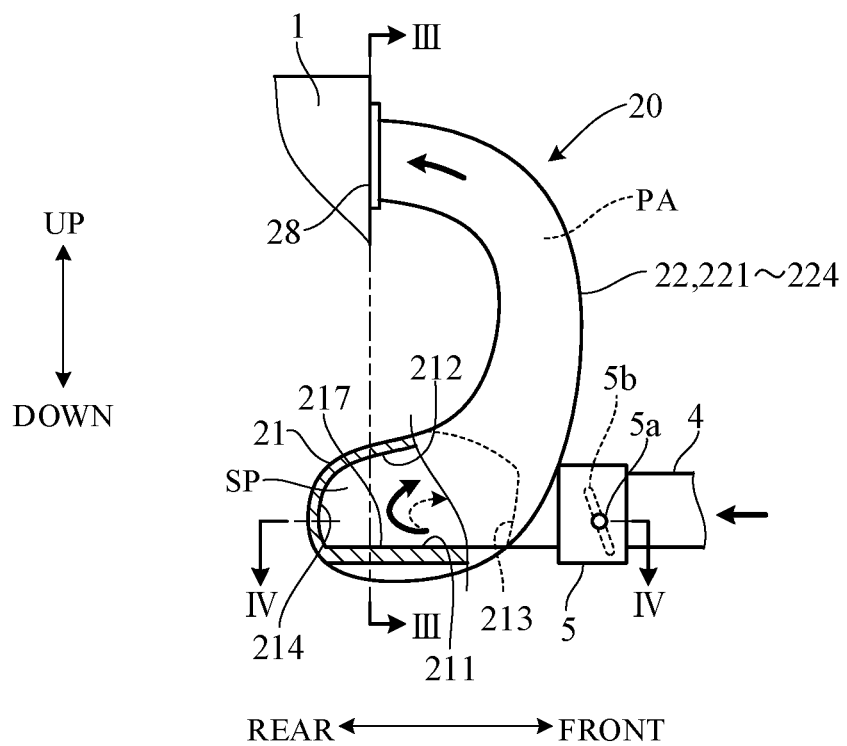
FIG. 2 is a side view (partially sectional view) schematically showing an example of installation of an intake manifold according to an embodiment of the present invention.

Hereinafter, an embodiment of the present invention is explained with reference to FIGS. 1 to 5. An intake manifold according to an embodiment of the present invention is a part of an intake apparatus in a multi-cylinder engine of a vehicle and is configured to introduce intake air to each cylinder of the engine, respectively. FIG. 1 and FIG. 2 are a plan view and a side view (partially sectional view) schematically showing an example of installation of an intake manifold according to an embodiment of the present invention. For convenience, front-rear direction, left-right direction and up-down direction are defined as shown in FIGS. 1 and 2, and the configurations of the components will be described in accordance with these definitions. The front-rear direction, left-right direction and up-down direction respectively correspond to length direction, width direction and height direction of the vehicle, for example.

As shown in FIG. 1, the engine 1 is a four-cylinder engine having four cylinders arranged in the left-right direction, and an internal combustion engine (gasoline engine, diesel engine or the like) for producing rotation output by burning fuel in a combustion chamber above each cylinder 1a. Although not shown in FIGS. 1 and 2, the engine 1 includes a cylinder block in which multiple cylinders 1a are formed, a piston slidably disposed in the cylinder 1a, a cylinder head attached to an upper surface of the cylinder block, and an intake port and an exhaust port provided at the cylinder head, etc. The intake air is introduced into each cylinder 1a through an intake apparatus 2 and the intake port, and exhaust gas is exhausted from each cylinder 1a through the exhaust port and an exhaust apparatus 3.

The intake apparatus 2 includes an air cleaner (not shown), an inlet pipe 4, a throttle valve 5, and an intake manifold 20 from an upstream side to a downstream side of the intake air. Foreign matter in the intake air is removed by the air cleaner, and the inlet pipe 4 guides the intake air after passing through the air cleaner to the throttle valve 5. Throttle valve 5 is configured as a butterfly valve that changes a flow path area by rotation of a disk 5b about a rotation shaft 5a extending in the left-right direction, for example, and the intake air quantity that passes through throttle valve 5 and is sucked into cylinder 1*a* is adjusted by driving of the throttle valve 5. The intake manifold 20 is configured to distribute the intake air that has passed through the throttle valve 5 to each cylinder 1*a* of the engine 1, and its detailed configuration will be described later.

The exhaust apparatus 3 includes an exhaust manifold 6, an exhaust pipe 7, and a catalytic device (not shown) provided at the end or in the middle of the exhaust pipe 7 from an upstream side to a downstream side of the exhaust gas. The exhaust manifold 6 is an exhaust collecting pipe for collecting the exhaust gas flowing out from each cylinder 1*a*, and is formed integrally with cylinder head (inside the cylinder head), for example. The exhaust manifold 6 may be formed separately from the cylinder head. The exhaust pipe 7 guides the exhaust gas discharged from the exhaust manifold 6 to the catalytic device (e.g., a three way catalytic device), whereby the exhaust gas is purified.

In addition, the engine 1 is provided with an EGR-device 10 that recirculates a portion of the exhaust gas into the combustion chamber of the cylinder 1*a*. The exhaust gas to be recirculated is referred to as EGR gas. The EGR-device 10 includes a branch pipe 11 connected to the exhaust pipe 7 on the upstream or downstream side of the catalytic device, a cooler 12 for cooling the EGR gas flowing through the branch pipe 11, and an EGR valve 13 for adjusting the flow rate of the EGR gas. The EGR gas that has passed the EGR valves 13 passes through a not shown path inside the cylinder head, and then is guided to the intake manifold 20. Alternatively, the EGR gas may be guided to the intake manifold 20 without passing through the cooler 12.

Although not shown in a drawing, a supercharger can be placed in the engine 1. The supercharger has an exhaust turbine rotated by the exhaust gas flowing through the exhaust pipe 7, and a compressor provided coaxially with the exhaust turbine so as to be rotated by the exhaust turbine to compress the intake air flowing through the inlet pipe 4. If the supercharger is provided, a part of the exhaust gas in the upstream or downstream side of the exhaust turbine is directed to the branch pipe 11.

Figure 3:
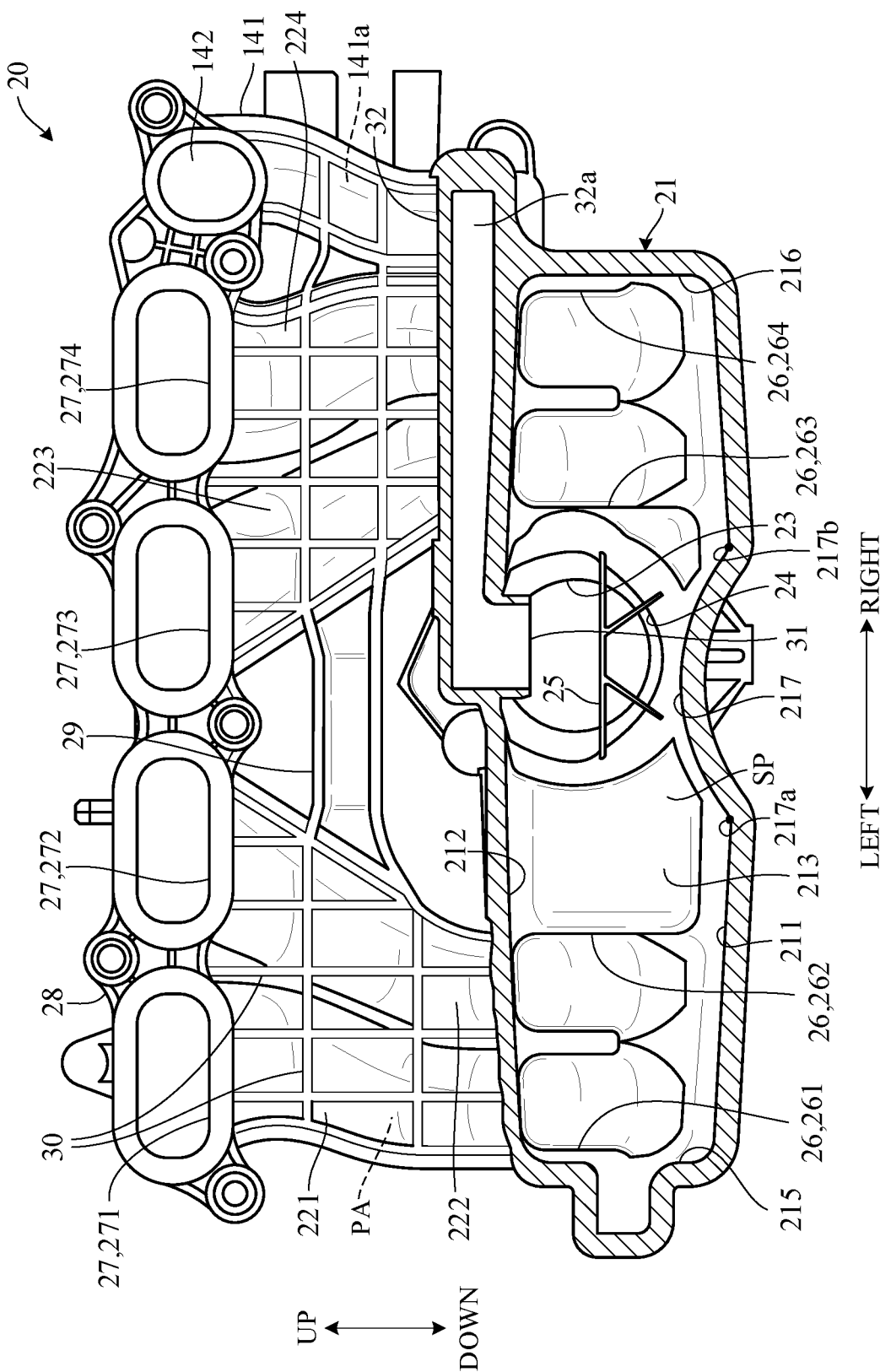
FIG. 3 is a cross-sectional view taken along line III-III of FIG. 2.
Figure 4:
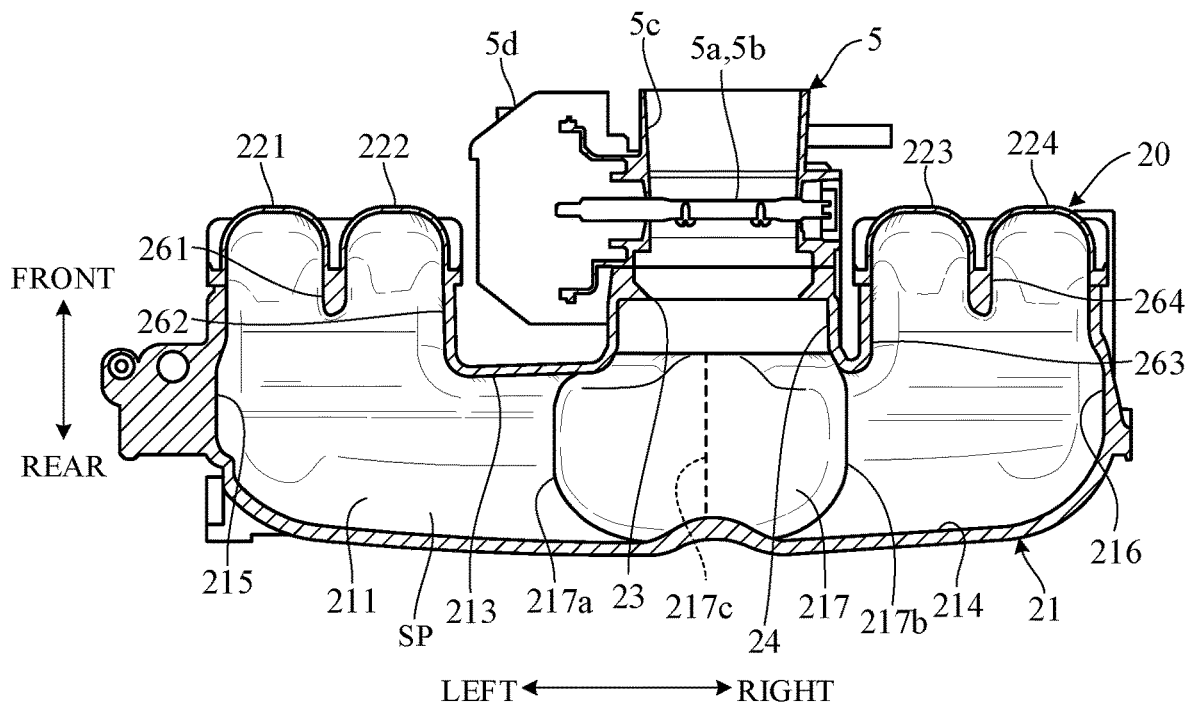
FIG. 4 is a cross-sectional view taken along line IV-IV of FIG. 2.

The configuration of the intake manifold 20 according to the present embodiment will be described in detail. FIG. 3 is a view seen from the rear of the intake manifold 20 unit (partial cross-sectional view), more specifically, a cross-sectional view taken along line of FIG. 2 extending vertically. FIG. 4 is a cross-sectional view of the intake manifold 20 and the throttle valve 5, taken along line IV-IV of FIG. 2 extending in the front-rear directions passing through the rotation shaft 5*a* of the throttle valve 5. The intake manifold 20 is formed of, for example, heat-resistant resins. More specifically, the intake manifold 20 is integrally formed by molding a plurality of components constituting the intake manifold 20 and then joining the plurality of components by vibrational welding or the like. The material constituting the intake manifold 20 may be metallic.

As shown in FIGS. 1, 3 and 4, the intake manifold 20 has a surge tank 21 extending in the left-right direction and a plurality of (four) branch pipes 22 branched from the surge tank 21 and extending substantially upward. The plurality of branch pipes 22 may be referred to as a first branch pipe 221, a second branch pipe 222, a third branch pipe 223 and a fourth branch pipe 224 in order from the left side.

As shown in FIGS. 2 to 4, the surge tank 21 forms a space SP elongated in the left-right direction by a bottom surface 211, an upper surface 212 facing the bottom surface 211, a front surface 213 connecting the front end of the bottom surface 211 and the front end of the upper surface 212, and a rear surface 214 connecting the rear end of the bottom surface 211 and the rear end of the upper surface 212, each of which extends in the left-right direction. Parts of the bottom surface 211, the upper surface 212, the front surface 213 and the rear surface 214 are formed in a curved surface shape, and a peripheral surface shape of the space SP is partially formed in a substantially arc shape. For example, the rear surface 214 has a concave curved surface shape.

The peripheral shape of the space SP may be a circular shape or an elliptical shape. When the bottom surface 211, the upper surface 212, the front surface 213 and the rear surface 214 of the surge tank 21 cannot be clearly distinguished, for example, when the peripheral surface shape is a circular or elliptical shape, the lower portion forms a bottom surface 211, the upper portion forms a upper surface 212, the front portion forms a front surface 213, and the rear portion forms a rear surface 214 when the surge tank 21 is divided into four portions on the lower side, the upper side, the front side, and the rear side. Each of the bottom surface 211, the upper surface 212, the front surface 213 and the rear surface 214 may be formed in a planar shape, and the peripheral surface shape of the space SP may have a substantially rectangular shape. The left and right end faces of the space SP are closed by a left face 215 and a right face 216.

As shown in FIGS. 3 and 4, a substantially circular inlet 23 is opened at the center in the left-right direction on the front surface 213 of the surge tank 21. More particularly, the inlet 23 is open at the front end of an inlet path 24 extending forwardly from the front surface 213. As shown in FIG. 4, a throttle valve 5 is disposed in front of the surge tank 21. A rear end surface of a substantially circular passage 5*c* of the throttle valve 5 is connected to the inlet 23. A motor 5*d* for driving the rotation shaft 5*a* is provided on the left side of the throttle valve 5. As shown in FIG. 3, a rectifying plate 25 is disposed in the inlet path 24 of the surge tank 21 so that the intake air that has passed through the throttle valve 5 is rectified and sucked into the surge tank 21.

Further, on the front surface 213 of the surge tank 21, a pair of left and right (four in total) outlets 26 are opened on each of the left and right sides of the inlet 23. The plurality of outlets 26 may be referred to as a first outlet 261, a second outlet 262, a third outlet 263 and a fourth outlet 264 in order from the left side. The first outlet 261 is connected to one end of the first branch pipe 221, the second outlet 262 is connected to one end of the second branch pipe 222, the third outlet 263 is connected to one end of the third branch pipe 223, and the fourth outlet 264 is connected to one end of the fourth branch pipe 224.

As shown in FIG. 2, each of the branch pipes 221 to 224 is bent backward and upward after extending obliquely from its one end portion (lower rear end portion) forward and upward, and the other end portion (upper rear end portion) is positioned above the surge tank 21 and faces backward. That is, each of the branch pipes 221 to 224 extends in a substantially C-shape from the front surface 213 of the surge tank 21 to the upper side of the surge tank 21.

As shown in FIG. 3, a discharge port 27 is provided at each of the other ends of the branch pipes 221 to 224. The plurality of discharge ports 27 are sometimes referred to as a first discharge port 271, a second discharge port 272, a third discharge port 273 and a fourth discharge port 274 in order from left to right. The branch pipes 221 to 224 form the intake passages PA from the outlets 261 to 264 to the discharge ports 271 to 274, respectively.

As a result, the intake air flowing backward from the inlet 23 of the front surface 213 of the surge tank 21 changes its flow direction to the left-right direction, and then flows forward along the rear surface 214, the upper surface 212, and the like as shown by the solid arrows of FIG. 2, and flows into the branch pipes 221 to 224 through the outlets 261 to 264, respectively. In this manner, the intake air in the surge tank 21 is distributed to each branch pipes 221 to 224, and then flows out through the intake passage PA and the discharge ports 271 to 274.

As shown in FIG. 3, the plurality of discharge ports 271 to 274 are formed identically-shaped, arranged at equal intervals in a row of the left-right direction corresponding to a position of the inlet port of the engine 1 (cylinder head), and integrally provided by the flange portions 28. On the right side of the fourth branch pipe 224, the passage through which EGR gas which has passed through in the cylinder head flows, i.e., a pipe portion 141 forming a recirculation path 141a of the EGR gas is disposed. An opening 142 provided at the upper end of the pipe portion 141 is located to the right of the fourth discharge port 274 and provided integrally with the discharge ports 271 to 274 by the flange portions 28. As shown in FIG. 2, the flange portions 28 are fastened to a front surface of the engine 1 (cylinder head) by bolts or the like, whereby the intake air is guided from each of the discharge ports 271 274 to each cylinder 1a through the inlet port. Furthermore, the EGR gas is flowed into the recirculation path 141a of the pipe portion 141 through the opening 142.

As shown in FIG. 3, on the front surface 213 of the surge tank 21, the first outlet 261, the second outlet 262, the third outlet 263 and the fourth outlet 264 are respectively provided adjoining the left-right direction. More specifically, the first outlet 261 and the second outlet 262 are arranged on the left end of the surge tank 21, and the third outlet 263 and the fourth outlet 264 are arranged on the right end of the surge tank 21. On the other hand, the second outlet 262 and the third outlet 263 are separated from each other, and the inlet 23 is provided between the second outlet 262 and the third outlet 263. The branch pipes 221 to 224 extend, while being bended inwardly of the left-right direction, so that the plurality of discharge ports 271 to 274 are spaced uniformly in the left-right direction.

The first branch pipe 221 and second branch pipe 222 are formed integrally throughout the length, and the third branch pipe 223 and the fourth branch pipe 224 are also formed integrally throughout the length. Further, the second branch pipe 222 and the third branch pipe 223 are connected to each other via a connecting member 29 in the vertical central portion. Reinforcement ribs 30 are provided in a grid pattern on rear surfaces of the branch pipes 221 to 224.

At the center in the left-right direction of the upper surface 212 of the surge tank 21, i.e. behind the inlet 23, an EGR inlet 31 is provided into which the EGR gas flows. The EGR inlet 31 opens downwardly and its aperture plane faces the bottom surface 211. A pipe portion 32 is provided on the upper wall of the surge tank 21 from the center in the left-right direction toward the right. The EGR inlet 31 is formed at the left end of the pipe portion 32. The pipe portion 32 forms a recirculation path 32a of the EGR gas that communicates with the EGR inlet 31 and extends rightward. The lower end portion of the pipe portion 141 is connected to the right end of the pipe portion 32, and via a through hole provided in the connecting portion to which the lower end of the pipe portion 141 is connected, the recirculation path 32a and the recirculation path 141a communicates. As a result, the EGR gas guided through the recirculation paths 141a and 32a flows from the EGR inlet 31 into the space SP of the surge tank 21.

As shown in FIGS. 3 and 4, as a characteristic configuration of the present embodiment, the bottom surface 211 of the surge tank 21 is provided with a swelling portion 217 that is swelled upwardly at the center in the left-right direction. The swelling portion 217 swells in a substantially arc-shaped cross section from the left end 217a to the right end 217b at the central portion of the left-right direction of the bottom surface 211, and a ridge line 217c (a dotted line in FIG. 4) obtained by connecting the apexes thereof extends in the front-rear direction. The inlet 23 is located in front of the swelling portion 217 and the EGR inlet 31 is located above the swelling portion 217.

As described above, in the present embodiment, the swelling portion 217 is provided at the central portion in the left-right direction of the bottom surface 211 of the surge tank 21. For this reason, condensed water existing in the space SP, such as condensed water contained in the intake air flowing in from the inlet 23 and condensed water contained in the EGR gas flowing in from the EGR inlet 31, does not remain on the swelling portion 217, but flows out of the left-right direction of the swelling portion 217 along the left and right inclined surfaces of the swelling portion 217 of the ridge line 217c. Then, as indicated by the solid arrow in FIG. 2, the condensed water passes through the branch pipe 22 along the flow of the intake air, and evaporates in the process of being sucked into the engine 1.

This can prevent condensed water in the surge tank 21 from scattering to the upstream side of the intake air via the inlet path 24 when a blowback to the upstream side of the intake air occurs as indicated by a dotted line arrow in FIG. 2 such as the throttle valve 5 is suddenly closed or the like. As a result, attachment of condensed water to the throttle valve 5 can be prevented, and the throttle valve 5 can be driven to open and close with high accuracy.

Figure 5:
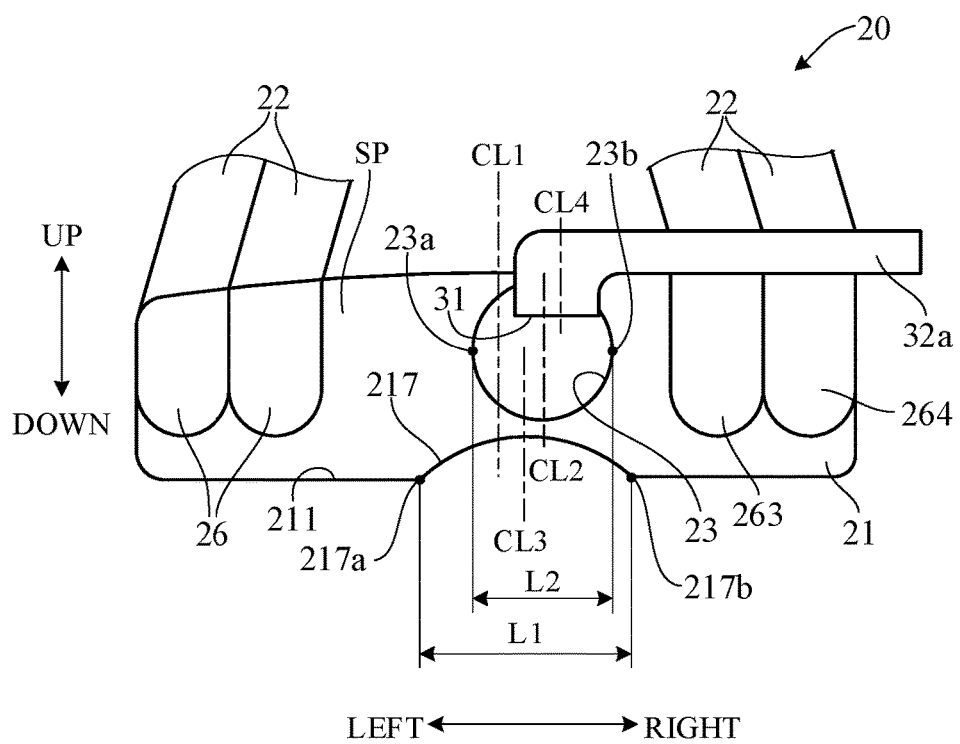
FIG. 5 is a cross-sectional view of a main part of the intake manifold schematically showing a positional relationship among an inlet, an EGR inlet and a swelling portion.

The positional relation among the inlet 23, the EGR inlet 31, and the swelling portion 217 will be described in more detail. FIG. 5 is a cross-sectional view of the main part of the intake manifold 20 schematically showing these positional relationships, and corresponds to a drawing showing FIG. 3 in a simplified manner. In FIG. 5, a vertical line passing through the center in the left-right direction of the intake manifold 20 (called as a first center line) is defined as CL1, a vertical line passing through the center in the left-right direction of the inlet 23 (called as a second center line) is defined as CL2, a vertical line passing through the center in the left-right direction of the swelling portion 217 (called as a third center line) is defined as CL3, and a vertical line passing through the center in the left-right direction of the EGR inlet 31 (called as a fourth center line) is defined as CL4.

As shown in FIG. 5, the left end 23a of the inlet 23 is located on the right side of the left end 217a of the swelling portion 217, and the right end 23b of the inlet 23 is located on the left side of the right end 217b of the swelling portion 217. Thus, the extent in the left-right direction in which the swelling portion 217 is provided, i.e., the left-right direction length L1 of the swelling portion 217, is longer than the length L2 in the left-right direction of the inlet 23, and the inlet 23 is positioned inside of the swelling portion 217 in the left-right direction. As a result, it is possible to prevent condensed water from staying below the region facing the inlet 23, more specifically, the region in which the inlet 23 is extended forward, and it is possible to reliably prevent condensed water from entering the inlet path 24 when the intake air is blown back.

With respect to the positional relation between the inlet 23 and the EGR inlet 31, the fourth center line CL4 is positioned rightward of the second center line CL2. Since the EGR gas flows into the space SP from the right through the recirculation path 32a, it tends to flow to the left along the flow of the intake air through the inlet 23. In this regard, by shifting the fourth center line CL4 to the right side of the second center line CL2, the EGR gas can be evenly distributed in the left-right direction within the space SP. As a result, the EGR gas can be evenly distributed to each branch pipe 22, and burning in each cylinder 1a of the engine 1 can be realized without variation.

With respect to the positional relation between the center of the surge tank 21 and the inlet 23, the second center line CL2 is positioned rightward of the first center line CL1. For this reason, the intake air flowed in through the inlet 23 easily flows to the right in the surge tank 21, whereby the EGR gas flowed in through the EGR inlet 31 easily flows to the right. Therefore, the EGR gas is restrained from flowing unevenly to the left due to the flow of the EGR gas from right to left in the recirculation path 32a, and the EGR gas can be evenly distributed in the left-right direction.

With respect to the positional relation between the swelling portion 217 and the inlet 23, the third center line CL3 is located on the left side of the second center line CL2. As a result, the intake air can be smoothly guided to the third outlet 263 closest to the inlet 23, and the intake air can be evenly distributed to the respective branch pipes 22. That is, when the second center line CL2 is positioned rightward of the first center line CL1 as described above, if the second center line CL2 and the third center line CL3 are set at the same position, the intake air flowing from the inlet 23 to the left-right direction tends to flow more to the fourth outlet 264 than the third outlet 263 because the distance between the swelling portion 217 and the third outlet 263 is short. As a result, the intake air quantity flowing through the branch pipe 22 varies. In this respect, since the third center line CL3 is positioned on the left side of the second center line CL2, the distance between the swelling portion 217 and the third outlet 263 becomes longer, and the intake air easily flows in the third outlet 263, and thus it is possible to suppress the occurrence of variation in the intake air quantity flowing through the branch pipes 22.

The present embodiment can achieve advantages and effects such as the following:

(1) The intake manifold 20 includes the surge tank 21 including the inlet 23 of air and the outlets 26 of the air arranged in the left-right direction and extended along the left-right direction so as to form the space SP having cross section larger than the inlet 23 between the inlet 23 and the outlets 26, and the branch pipes 22, each of which has a first end (lower end) connected to each of the outlets 26 to introduce the air into the cylinder 1a of the engine 1 through the branch pipe 22 (FIGS. 1 and 3). The space SP is formed by the bottom surface 211 of the surge tank 21 extended along the left-right direction and formed in a shape of flat surface or curved surface, the upper surface 212 extended along the left-right direction to face the bottom surface 211, and the front surface 213 and the rear surface 214 extended from the bottom surface 211 to the upper surface 212 (FIG. 2). The inlet 23 is provided at substantially central portion in the left-right direction on the front surface 213 of the surge tank 21 so that the air flows into the space SP along the inlet path 24 extending in the front-rear direction (FIGS. 3 and 4). The bottom surface 211 includes the swelling portion 217 swelled upwardly at substantially central portion in the left-right direction (FIGS. 3 and 4).

With this configuration, condensed water present in the space SP, such as condensed water contained in the intake air flowing into through the inlet 23 and condensed water contained in the EGR gas flowing into through the EGR inlet 31, flows outward in the left-right direction of the swelling portion 217 along the inclined surface of the swelling portion 217. Therefore, when the intake air blows back, condensed water can be prevented from scattering to the throttle valve 5.

(2) The swelling portion 217 is formed from the first position (left end 217a) to the second position (right end 217b) at the center portion in the left-right direction. The length L1 of the swelling portion 217 in the left-right direction is longer than the length L2 of the inlet 23 in the left-right direction, and the inlet 23 is provided to be disposed between the first position and the second position of the swelling portion 217 in the left-right direction (FIG. 5). This can prevent condensed water from staying in the area facing the inlet 23, and can reliably prevent condensed water from entering the inlet path 24 when the intake air is blown back.

(3) The EGR inlet 31 connected to the recirculation path 32a is provided above the swelling portion 217 at the upper surface 212 of the surge tank 21 so that EGR gas flowing through the recirculation path 32a from the engine 1 flows into the space SP (FIG. 3). As a result, condensed water contained in the EGR gas flows to the left and right outer sides of the swelling portion 217, so that condensed water can be prevented from scattering to the throttle valve 5 side.

(4) The recirculation path 32a is extended from the EGR inlet 31 rightward (FIG. 3). The EGR inlet 31 is provided so that the center position (the forth center line CL4) thereof in the left-right direction is positioned on the right side of the center position (the second center line CL2) of the inlet 23 in the left-right direction (FIG. 5). Therefore, the EGR gas flowing into the space SP from the right side through the recirculation path 32a can be evenly distributed to the left-right direction in the space SP, and burning in each cylinder 1a of the engine 1 can be realized without variation.

(5) The inlet 23 is provided so that the center position (the second center line CL2) thereof in the left-right direction is positioned on the right side of the center position (the first center line CL1) in the left-right direction of the outlets 26 (FIG. 5). As a result, the intake air flowing in through the inlet 23 easily flows rightward of the surge tank 21, so that the EGR gas flowing in along the leftward recirculation path 32a is restrained from being biased leftward. Therefore, the EGR gas can be evenly distributed to the left-right direction.

(6) The swelling portion 217 is provided so that the center position (the third center line CL3) thereof in the left-right direction is positioned on the left side of the center position (the second center line CL2) in the left-right direction of the inlet 23 (FIG. 5). Thereby, the intake air can be smoothly guided to the third outlet 263 closest to the inlet 23, and the intake air can be evenly distributed to the respective branch pipes 22 without shortage of the intake air quantity flowing through the third outlet 263.

(7) The plurality of (four) outlets 26 are disposed on the left side and right side of the inlet 23 so as to separate two by two, that is, the equal number of outlets 26 are disposed on both sides of the inlet 23 in the left-right direction (FIG. 3). As a result, the intake air flowing in through the inlet 23 can be evenly distributed to the respective outlets 26.

(8) The inlet 23 and the outlets 26 are arranged side by side in the left-right direction on the front surface 213 of the surge tank 21 (FIG. 3). In such a configuration, the intake air flowing in through the inlet 23 does not flow out from outlet 26 as it is, but flows out from the outlet 26 after changing the flow directions in the space SP. Therefore, the intake air can be uniformly guided to the respective outlets 26.

The embodiments described above can be modified in various forms. Hereinafter, a modified example will be described. Although in the above embodiment, the inlet 23 and the outlets 26 are arranged in the left-right direction (a first direction) on the same surface as each other (the front surface 213) of the surge tank 21, the inlet and the outlets may not be on the same surface as each other. Therefore, as long as being extended in a first direction and forming a space having a cross section larger than the inlet between the inlet and the plurality of outlets, the configuration of a surge tank is not limited to the above configuration.

In the above embodiment, each of the branch pipes 22 is formed in the substantially C shape so as to extend upward from the front surface 213 of the surge tank 21 and is configured so as to have the discharge port 27 facing rearward on the upper end thereof. However, the configuration of the branch pipe 22 branched from the surge tank 21 is not limited to the above configuration. In other words, as long as a first end thereof is connected to each of the outlets of the surge tank to introduce an air into a plurality of cylinders of an internal combustion engine therethrough, the configuration of a branch pipe is not limited to the above configuration.

In the above embodiment, the space is formed by the surge tank 21 extending in the left-right direction (a first direction), i.e., the bottom surface 211, the upper surface 212, the front surface 213 (a first surface) and the rear surface 214 (a second surface) of the surge tank 21, and the inlet 23 is provided at the center portion in the left-right direction of the surge tank 21 so that air flows into the space SP along the inlet path 24 extending in the front-rear direction (a second direction). However, the first direction and the second direction perpendicular to each other are not limited to the above directions. In the above embodiment, the branch pipes 22 are extended along the up-down direction (a third direction) perpendicular to the first and second directions, and the pipe portion 141 is disposed side by side with the branch pipes 22. However, the configuration of a pipe portion connected to the recirculation path 32a is not limited to the above configuration. Although in the above embodiment, the swelling portion 217 swelled upwardly and formed in a substantially arcuate cross section is provided at center portion in the left-right direction on the bottom surface 211 of the surge tank 21, the configuration of a swelling portion swelled upwardly is not limited to the above configuration.

In the above embodiment, EGR gas is flowed into the space SP from the EGR inlet 31 (a recirculation gas inlet) above the swelling portion 217 through the recirculation path 32a. However, a blow-by gas may be flowed into a space from a recirculation gas inlet. In the above embodiment, the recirculation path 32a extending in the left-right direction is formed integrally with the surge tank 21. However, a recirculation path may be configured separately from a surge tank and only a recirculation gas inlet may be provided at a surge tank. In the above configuration, EGR gas is flowed into the pipe portion 141 configured integrally with the intake manifold 20 through the path formed in the cylinder head. However, not through the cylinder head, EGR gas may be flowed into an intake manifold.

Although in the above embodiment, the engine 1 is configured as a four-cylinder engine, a number of the cylinders of an internal combustion engine is not limited to the above number. Therefore, a number of outlets is not also limited to the above number.

The above embodiment can be combined as desired with one or more of the above modifications. The modifications can also be combined with one another.

According to the present invention, it is possible to prevent condensed water in a surge tank from scattering to an inlet side of intake air.

Above, while the present invention has been described with reference to the preferred embodiments thereof, it will be understood, by those skilled in the art, that various changes and modifications may be made thereto without departing from the scope of the appended claims.

What is claimed is:

1. An intake manifold comprising:
   a surge tank including an inlet of an air and a plurality of outlets of the air arranged in a first direction, extended along the first direction, and configured to form a space having a cross section larger than the inlet between the inlet and the plurality of outlets; and
   a plurality of branch pipes, each of the plurality of branch pipes having a first end connected to each of the plurality of outlets to introduce the air into a plurality of cylinders of an internal combustion engine through the each of the plurality of branch pipes, wherein
   the space is formed by a bottom surface extended along the first direction and formed in a shape of a flat surface or a curved surface, an upper surface extended along the first direction to face the bottom surface, a first surface extended from a first end of the bottom surface to a first end of the upper surface, and a second surface extended from a second end of the bottom surface to a second end of the upper surface,
   the inlet is provided at a substantially central portion in the first direction on the first surface so that the air flows into the space along a second direction substantially perpendicular to the first direction, and
   the bottom surface includes a swelling portion swelled upwardly at a substantially central portion in the first direction.

2. The intake manifold according to claim 1, wherein
   the swelling portion is formed from a first position to a second position in the first direction, and
   the inlet is provided between the first position and the second position in the first direction.

3. The intake manifold according to claim 1, wherein
   the upper surface includes a recirculation gas inlet connected to a recirculation path and provided above the swelling portion so that a recirculation gas flowing through the recirculation path from the internal combustion engine flows into the space.

4. The intake manifold according to claim 3, wherein
   the recirculation path is extended from the recirculation gas inlet to a first end side in the first direction, and
   the recirculation gas inlet is provided so that a center position in the first direction of the recirculation gas inlet is positioned on the first end side in the first direction of a center position in the first direction of the inlet.

5. The intake manifold according to claim 4, wherein
   the inlet is provided so that the center position in the first direction of the inlet is positioned on the first end side of a center position in the first direction of the plurality of outlets.

6. The intake manifold according to claim 5, wherein
   the swelling portion is provided so that a center position in the first direction of the swelling portion is positioned on a second end side in the first direction of the center position in the first direction of the inlet.

7. The intake manifold according to claim 3, wherein
the each of the plurality of branch pipes is extended along a third direction substantially perpendicular to both the first direction and the second direction, and includes a second end at which a discharge port of the air is formed.

8. The intake manifold according to claim 7, further comprising
a pipe portion extended along the third direction side by side with the plurality of branch pipes and connected to the recirculation path.

9. The intake manifold according to claim 1, wherein
the plurality of outlets are disposed in equal numbers on both sides of the inlet in the first direction.

10. The intake manifold according to claim 1, wherein
the plurality of outlets are arranged side by side with the inlet on the first surface.

* * * * *